W. HUNT.
Cartridge.
No. 164.
Reissued Feb. 26, 1850.
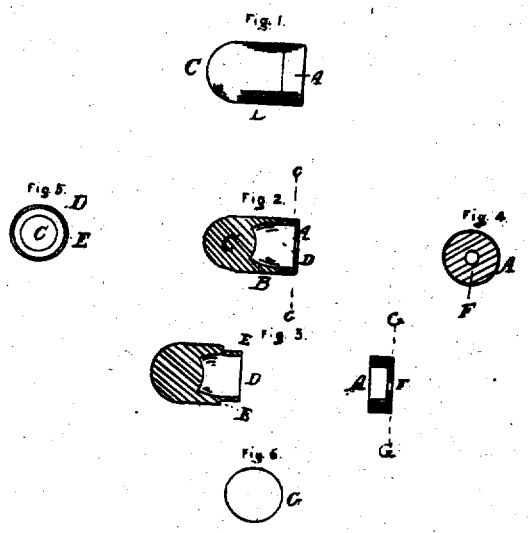

UNITED STATES PATENT OFFICE.

WALTER HUNT, OF NEW YORK, N. Y., ASSIGNOR TO GEO. A. ARROWSMITH.

METALLIC CARTRIDGE.

Specification forming part of Letters Patent No. 5,701, dated August 10, 1848; Reissue No. 164, dated February 26, 1850

*To all whom it may concern:*

Be it known that I, WALTER HUNT, of the city, county, and State of New York, have invented a new and useful improvement in the construction of a metallic cartridge made entire with the ball, for fire-arms, which I term a "rocket-ball"; and I do hereby declare that the following is a true and faithful description of the same.

The nature of my invention consists in making balls of metal for fire-arms with the rear part thereof cylindrical and with a cavity of sufficient capacity to receive the entire charge of gunpowder, which is therein confined by a cap, or the equivalent thereof, having a central hole, through which the charge is inflamed.

Figure 1 in the annexed drawings is an external longitudinal view of said rocket-ball, which is charged ready for use. Upon the open end of the cartridge is fitted a thin sheet-metal cap, A. Upon the opposite front end of B (the cartridge) projects one-half of the ball C, which all together resemble the ordinary top thimble. Fig. 2 gives a longitudinal cut sectional view of the same, showing the internal structure of the cap A, cavity D in the cartridge B, and its junction with the ball C. The dissected longitudinal cut section, Fig. 3, shows the cap A separated from the flange or neck formed by the shoulder at the dotted line E upon the rear end of B. Fig. 4 is an end or face view of A, which in form resembles the Chinese gong, with a central perforation, F, in its discous head, which is the point of ignition from the priming. Over this perforation upon the inside face of said cap is placed a thin water-proof tissue or seal (see Fig. 2) at the dotted line G and face view, Fig. 6. This seal may be made of any thin material through which the fire from the priming may penetrate, and which will at the same time secure the powder in the cartridge from escape or accidental injury. This ball and thimble should be formed in molds by pressure. The powder being well packed in the cavity D, the cap A lined, with the seal G being fixed upon the flange, and pressed up to the shoulder E, should then be subjected to a second pressure, in order to fix the cap firmly and produce a uniformity in the size of the cartridges.

It will be readily perceived that this plan of a combined ball and cartridge is well adapted to fire-arms made to be charged at the breech, from the fact that in firing this ball the cap A is left in the breech, with its head or disk pressed firm against the breech-plug, and its rim or flange forced outward against the inner periphery of the caliber of the barrel, forming an air-tight stopper, which effectually prevents all backward escape of the powder, notwithstanding the breech-plug may be loosely fitted in the breech of the barrel behind the charge, which must necessarily be the case in all reciprocating breech-pins, in order to prevent their binding from heat, deposits, &c., in rapid firing. It is also obvious that in guns made with piston breech-pins the cap A in my plan would be carried out forward of each succeeding ball, operating as an effectual wiper to the barrel at each discharge of the piece.

I am aware that balls have been made with a small cavity in the rear end thereof, to contain a charge of fulminating powder, or of fulminating-powder mixed with a small portion of common gunpowder; and I am also aware that a metal cap with a hole in the center has been used to retain the charge in a cylindrical paper cartridge attached to an ordinary ball, the cap being left, by the discharge, in the barrel, and pushed out by the succeeding charge. I do not therefore claim either of these as of my invention; but What I do claim as my invention, and desire to secure by Letters Patent, is—

Making metallic balls for fire-arms with the rear part thereof cylindrical, and a cavity in the said cylindrical part of sufficient capacity to receive the entire charge of gunpowder, substantially as herein described, when the said charge is retained in the ball by a cap or the equivalent thereof, having a central hole through which the charge can be inflamed, substantially as described.

WALTER HUNT.

Witnesses:
ROBT. D. HOLMES,
WILLIAM H. MARSAE.